United States Patent [19]
DelDuca

[11] Patent Number: 5,122,029

[45] Date of Patent: Jun. 16, 1992

[54] APPARATUS AND METHOD FOR AUTOMATICALLY COUNTING AND STACKING TRIMMED MOLDED ARTICLES

[75] Inventor: Gary DelDuca, Canandaigua, N.Y.

[73] Assignee: Mobil Oil Corporation, Fairfax, Va.

[21] Appl. No.: 606,688

[22] Filed: Oct. 31, 1990

[51] Int. Cl.⁵ .......................................... B65G 57/30
[52] U.S. Cl. ........................... 414/789.2; 414/788.2; 414/798.4; 414/798.5; 83/91; 83/85; 83/86; 83/97
[58] Field of Search ............... 414/788.2, 789.9, 790.2, 414/794.9, 795.3, 795.2, 900, 790, 798.1, 798.2, 788.6, 789, 789.2, 790.3; 221/297; 83/97, 228, 556, 84-87, 90, 91, 94

[56] References Cited

U.S. PATENT DOCUMENTS

| | | | |
|---|---|---|---|
| 2,497,124 | 2/1950 | Harvey | 414/795.3 X |
| 3,231,100 | 1/1966 | Faeber | 414/788.2 |
| 3,330,423 | 7/1967 | Kirkhof | 414/795.3 X |
| 3,330,425 | 7/1967 | Reda | 414/795.3 X |
| 3,360,100 | 12/1967 | Seragnoli | 414/795.3 X |
| 3,499,063 | 3/1970 | Ninneman et al. | 414/788.2 X |
| 3,526,075 | 9/1970 | Mueller et al. | 414/788.2 X |
| 3,759,303 | 9/1973 | Henrichs et al. | 414/795.3 X |
| 3,765,546 | 10/1973 | Westerling | 414/795.2 |
| 3,866,763 | 2/1975 | Alduk | 414/795.3 X |
| 3,895,574 | 7/1975 | Nyborg | 414/795.3 X |
| 4,270,445 | 6/1981 | Stubbings | 414/788.2 X |
| 4,313,358 | 2/1982 | Brown | 83/97 |
| 4,391,171 | 7/1983 | Wendt | 83/82 |
| 4,526,074 | 7/1985 | Johnson | 83/97 |
| 4,597,705 | 7/1986 | Scheeler et al. | 414/30 |
| 4,743,153 | 5/1988 | Kontz | 414/795.3 X |
| 4,802,808 | 2/1989 | Wolk et al. | 414/789 |
| 4,834,606 | 5/1989 | Burns et al. | 414/795.3 |
| 4,856,393 | 8/1989 | Braddon | 83/50 |
| 4,865,515 | 9/1989 | Dorner et al. | 414/788.2 |
| 4,890,524 | 1/1990 | Brown et al. | 83/615 |

FOREIGN PATENT DOCUMENTS 2648563  5/1978  Fed. Rep. of Germany ... 414/795.3

Primary Examiner—Frank E. Werner
Assistant Examiner—Brian Dinicola
Attorney, Agent, or Firm—Alexander J. McKillop; Charles J. Speciale; Michael J. Mlotkowski

[57] ABSTRACT

An apparatus for automatically stacking molded articles successively trimmed by a trim press from a web of thermoplastic material, the trim press having a stationary die member which includes a die plate and a die shoe, the apparatus comprising: (a) a frame; (b) a carriage mounted to the frame; (c) at least one stacking mechanism, the stacking mechanism comprising: (i) a plurality of stack rods rotatively mounted to the carriage, each of the stack rods having a stack dog located substantially perpendicular to a first end thereof the stack dog positionable within a corresponding aperture of the die shoe of the stationary die member; and (ii) mechanism for rotating the stack rods so that the stack dog engages an endmost article of a completed stack of articles, the stack of articles located at least partially within the die shoe of the stationary die member; and (d) mechanism for transporting the completed stack of articles from within the die shoe of the stationary die member to a position for removal from the apparatus.

8 Claims, 9 Drawing Sheets

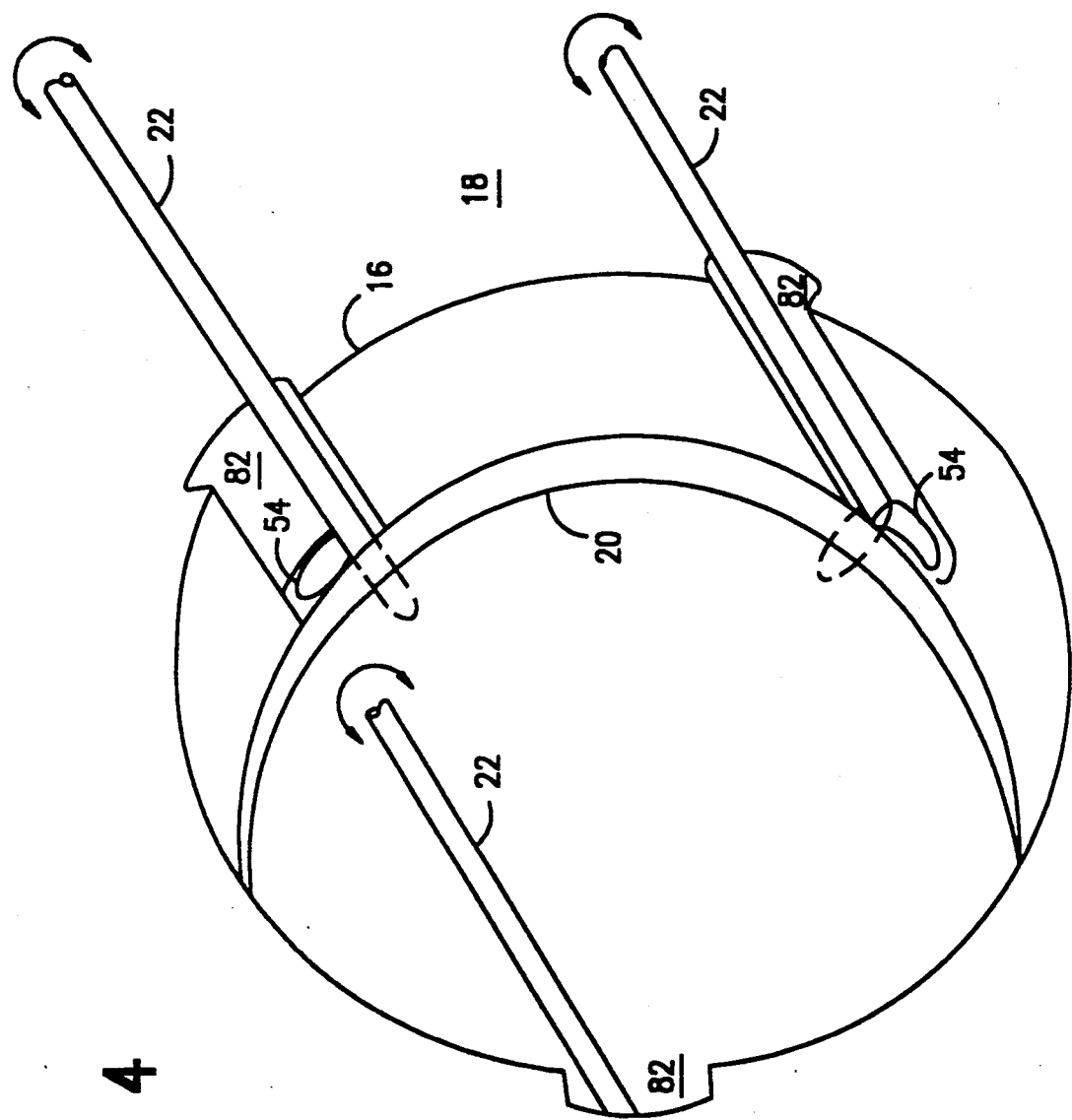

APPARATUS AND METHOD FOR AUTOMATICALLY COUNTING AND STACKING TRIMMED MOLDED ARTICLES

FIELD OF THE INVENTION

The present invention relates to the counting and stacking of molded articles and, more particularly, to an apparatus for the automatic counting and stacking of mass produced thermoformed articles.

BACKGROUND OF THE INVENTION

Many products produced by thermoforming, such as plates, bowls, trays, cups, lids, containers, and the like, often require the trimming away of excess material as a final step of the formation process. Various apparatus and methods are known and employed in industry for trimming or severing a plurality of thermoformed articles from a continuous web or sheet of thermoplastic material. Generally, the web of thermoplastic material with the thermoformed articles molded therein is transported from the thermoformer at relatively high rates of speed and throughputs and is then conducted to a trim press for the severing of the thermoformed articles from the web of thermoplastic material. Such trim presses are usually comprised of a stationary platen and a reciprocally movable platen for the mounting of a plurality of cooperating die members, or complementary punch and die members which are conformed to the outer or peripheral configuration of each of the thermoformed articles, and are adapted to provide for concurrent trimming of a number of individual articles from the web.

As thermoforming technology has improved and thermoforming speeds increase, it has become necessary to run trim presses at higher rates of speed in order to continue to provide an in-line trimming operation. A number of patents are directed to improvements in trim press technology for the purpose of increasing the speed of trim press operations. Such patents include U. S. Pat. Nos. 4,313,358, 4,391,171, 4,526,074, and 4,890,524, to which reference is made for those details.

While improvements have been made in operations related to the mass production of thermoformed articles, the counting and stacking of those articles is often performed manually. In those operations employing manual stacking, the article, after it is formed and trimmed, may pass into a receptacle or onto a conveyor where it is thereafter manually arranged into a stack. As can be appreciated, this often proves to be quite labor intensive, compared with the rest of the production operation. In such operations, excessive labor costs are often experienced, providing the motivation to automate.

One improved apparatus is described in U. S. Pat. No. 4,526,074, issued to Johnson. U. S. Pat. No. 4,526,074 discloses a system to increase the speed of trim press operations wherein a male locator is adapted to be reciprocated toward and away from a stationary cutter. The locator forces the severed thermoformed article which has been captured by the cutter into a cavity, or die shoe, encompassed by the blade structure. Each subsequent severing operation, wherein a successive thermoformed article is aligned with the cutting blade structure and urged against the cutting edge thereof, upon the forward reciprocating stroke of the male locator, will cause the preceding severed thermoformed article to be forced further into and through the die shoe cavity, thereby producing a stack of trimmed thermoformed articles in a nested relationship which may then be removed for further handling. While U. S. Pat. No. 4,526,074 provides a system which produces a stack of nested articles, the articles must still be removed and counted before packaging for the customer. U. S. Pat. No. 4,526,074 is incorporated by reference for all that it discloses.

A variety of other specialized stackers are known to those skilled in the art. For example, U. S. Pat. No. 3,499,063 discloses an apparatus for collecting and stacking plastic articles received from a blow molding machine. The articles are stacked in a stacking frame which retains the stack by having the lowermost article rest on a spring loaded pawl which extends into the path of incoming articles at the opening. The incoming article moves into the opening, depresses the pawl, moves past the pawl and nests into the stack of articles, lifting the stack from the pawl in the process. Thereafter, the stack of articles is lowered back onto the pawl where it rests until the next article is inserted.

U. S. Pat. No. 4,597,705 relates to an apparatus for the automatic stacking of a predetermined number of pie shells in nested relation for subsequent packaging. The automatic stacking machine disclosed includes an inverted U-shaped structure, the legs of which straddle a conveyor on which the items to be stacked are carried to a location between the legs of the stacker. The legs of the stacker house like means for engaging the item to be stacked on opposite sides and lifting the item to an elevated position where it is deposited on holding means to be retained while the lifting means is returned to the lower position for engaging and lifting the next item to be stacked. When the desired number of items are held in the stack, an automatic kicker means pushes the the stacked items off the holding means and onto means for delivering the stack for further processing.

U. S. Pat. No. 4,802,808 discloses a stacking apparatus for deep-drawn plastic articles. The apparatus includes a removal station formed by a support plate forwardly moveable horizontally underneath the raised stack of formed articles, a pushing device arranged above the support plate and moveable parallel relative to the support plate, and a tilting frame located adjacent the support plate when the support plate is in the forwardly moved position.

Although the aforementioned devices have generally performed their intended stacking functions in an acceptable manner, it is to be noted that they do not meet the needs which exist in the mass production of molded articles, such as containers, bowls, plates, trays cups, lids and the like, which require the subsequent trimming or severing of a plurality of the articles from a continuous web or sheet of thermoplastic material. None of the machines known in the art possess the type of utility required by the aforementioned operation.

Therefore what is needed is an apparatus and method for automatically counting and stacking trimmed molded articles which provides the speed and accuracy required in the mass production of such articles.

SUMMARY OF THE INVENTION

In accordance with the present invention, there is provided an apparatus for automatically stacking molded articles successively trimmed by a trim press from a surrounding web of thermoplastic material, the trim press having a stationary die member which includes a die plate and a die shoe, the apparatus comprising: (a) a frame; (b) a carriage means mounted to the frame; (c) at least one stacking mechanism, the stacking mechanism comprising: (i) a plurality of stack rods rotatively mounted to the carriage means, each of the stack rods having a stack dog located substantially perpendicular to a first end thereof, the stack dog positionable within a corresponding aperture of the die shoe of the stationary die member; and (ii) means for rotating the stack rods so that the stack dog engages an endmost article of a completed stack of articles, the stack of articles located at least partially within the die shoe of the stationary die member; and (d) means for transporting the completed stack of articles from within the die shoe of the stationary die member to a position for removal from the apparatus.

Also provided is a method of automatically counting and stacking molded articles successively trimmed by a trim press from a web of thermoplastic material, the trim press having a stationary die member which includes a die plate and a die shoe, comprising the steps of: (a) establishing an article count value, the article count value equal to a completed stack of articles; (b) retaining articles successively trimmed by a trim press from a web of thermoplastic material within a cavity defined by the stationary die member of the trim press; (c) ejecting a stack of articles into a position for removal within the die shoe upon reaching the article count value established in step (a); (d) engaging the endmost article of the completed stack of articles by rotating a plurality of stack rods mounted to a carriage means of an apparatus for stacking trimmed molded articles, each of the stack rods having a stack dog located substantially perpendicular to a first end thereof, the stack dog positionable within a corresponding aperture of the die shoe of the stationary die member; and (e) removing a completed stack of articles from the die shoe.

Therefore, it is an object of the present invention to provide an apparatus for automatically counting and stacking articles which is capable of operating in-line with a thermoforming operation.

It is another object of the present invention to provide an apparatus for automatically counting and stacking articles which operates in cooperation with an article trimming operation.

It is a further object of the present invention to provide an apparatus which receives articles trimmed from a sheet of thermoplastic material and automatically counts and stacks such articles at the high speeds required of mass production operations even when such articles are formed in a plurality of transversely disposed rows.

It is yet another object of the present invention to provide an apparatus for automatically counting and stacking articles which operates at the high speeds required of mass production operations without crushing the articles so stacked.

It is still a further object of the present invention to provide a method for automatically counting and stacking molded articles successively trimmed by a trim press from a web of thermoplastic material.

Other objects and the several advantages of the present invention will become apparent to those skilled in the art upon a reading of the specification and the claims appended thereto.

BRIEF DESCRIPTION OF THE DRAWINGS

Reference may now be had to the following detailed description of an exemplary embodiment of the inventive apparatus for automatically counting and stacking molded articles successively trimmed by a trim press from a surrounding web of thermoplastic material, taken in conjunction with the accompanying drawings, in which:

FIG. 4 is a generally schematic representation, in perspective, of the interaction of a die shoe and stack rods of an embodiment of the apparatus of the present invention.

DETAILED DESCRIPTION OF THE INVENTION

Figure 1:
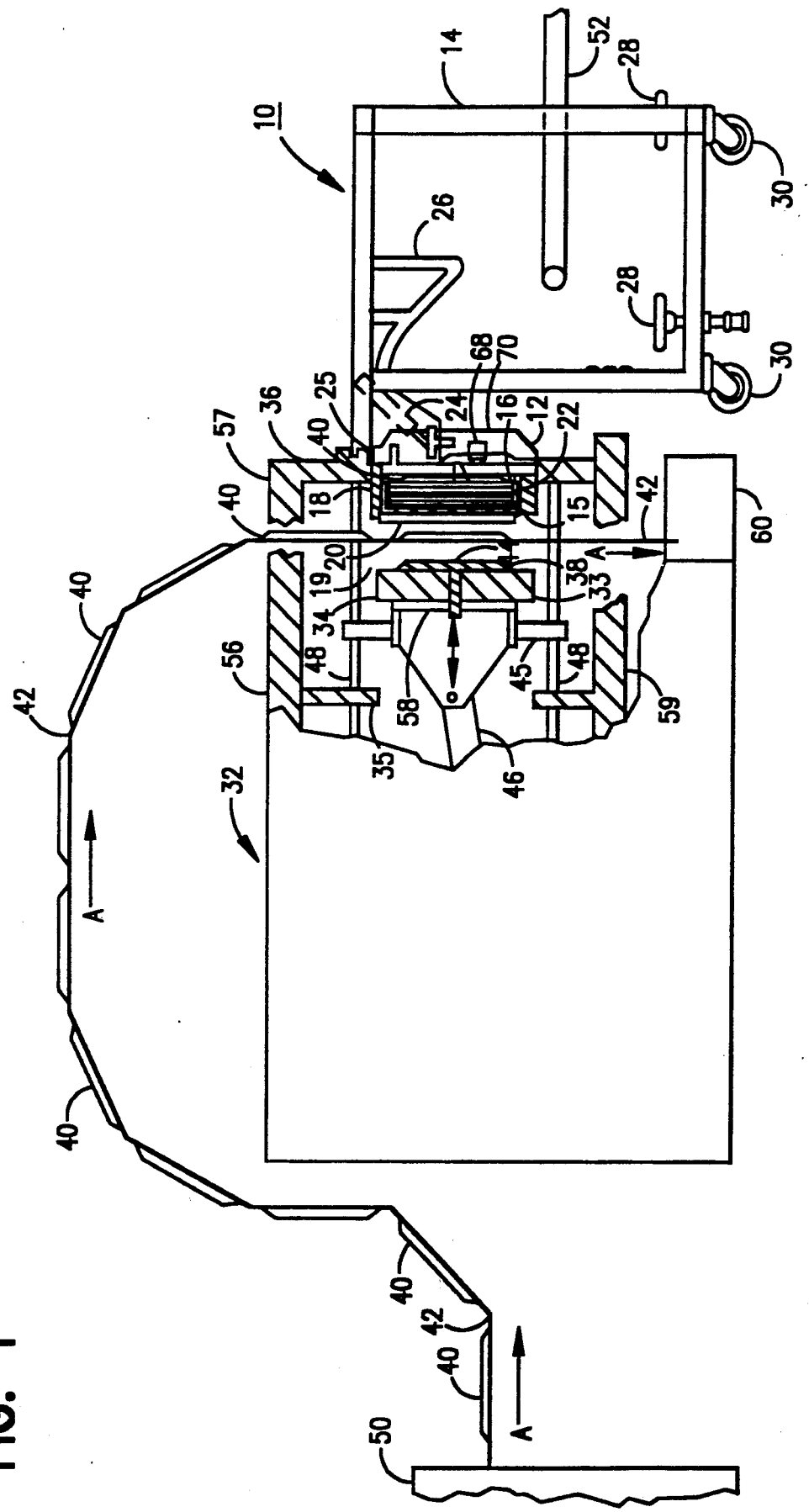
FIG. 1 illustrates, in a generally schematic representation, an apparatus for automatically counting and stacking molded articles, installed in cooperation with a trim press, according to the present invention.

The present invention is best understood by reference to the appended figures, which are given by way of example and not of limitation. Referring now to FIG. 1, one embodiment of an apparatus for automatically counting and stacking molded articles is shown installed in line with a trim press of substantially conventional design. As may be seen, a continuous web or sheet of a thermoplastic material 42 into which a succession of thermoplastic articles 40 have been molded in a thermoformer 50 is conveyed in the direction of arrows A. The articles 40 may consist of moldings in the form of, for example, cups, trays, plates, lids, bowls, containers or the like. The web 42, with the thermoformed articles 40 molded therein is conveyed in a predetermined intermittent manner through the intermediary of suitable feed or indexing devices, not shown, to trim press 32.

Trim press 32, comprises a stationary support frame 56, including vertical support members 35 and 36 and horizontal support members 57 and 59. Supported by vertical support members 35 and 36 is a trimming arrangement 19 for trimming or severing thermoformed articles 40 from thermoplastic web 42. As shown, the trimming arrangement 19 includes, supported by vertical support member 36 which forms a stationary platen, a stationary die member 15 and, supported by movable platen 58, a movable punch member 33. Stationary die member 15 is comprised of die shoe 18, which defines a central cavity 16 having a shape in general conformance with the outer periphery of the articles 40 being severed from thermoplastic web 42, and die plate 20 also having a central cavity having a shape in general conformance with the outer periphery of the articles 40 being severed. Movable punch member 33 is comprised of punch plate 34 and punch 38, which is mounted upon punch plate 34. Also, in accordance with the present invention, movable punch member 33 includes a low mass article ejector 44, the operation of which will be described hereinbelow.

Movable platen 58 includes side arms 45 adapted to be reciprocated along guide rods 48 through the action of crankarm 46 which may be, as is sometimes the case, activated by a rotatable flywheel (not shown). As can be appreciated by those skilled in the art, when a system employing a flywheel is used, the flywheel may be connected to a drive motor through a suitable drive belt or other connecting means to translate the rotary motion of the flywheel into a reciprocating movement.

Still referring to FIG. 1, an embodiment of the article counting and stacking apparatus 10 of the present invention is shown positioned to cooperate with trim press 32. Counting and stacking apparatus 10 is comprised of frame 14, to which carriage means 12 is mounted in such a manner so as to permit machine-direction horizontal movement along frame 14, casters 30 and, as is preferred, a plurality of hold-down mechanisms 28. Also shown in FIG. 1 is an optional conveyor means 52 for transferring the counted stacks of thermoplastic articles to another location for further manual or automatic activity. Carriage means 12 is comprised of at least one stacking mechanism 25, stacking mechanism 25 itself including: a plurality of stack rods 22 rotatively mounted to carriage means 12, each of the stack rods 22 having a stack dog 54 (see FIG. 4) located substantially perpendicular to a first end of stack rod 22 and means for rotating stack rods 22, a part of which is identified on FIG. 1 as element 68. Also as shown, stack rod 22 is positionable within a corresponding aperture 82 (see FIG. 4 for a detailed view thereof) of die shoe 18 of stationary die member 15. Additional details concerning carriage means 12 will be discussed below.

Positioned below trimming arrangement 19 is a scrap grinder 60 for receiving and processing the thermoplastic web material 42 remaining from the trimming operation conducted above. As can be appreciated, the use of grinder 60 is conventional in such thermoforming and trimming operations and forms no part of the present invention.

In operation, thermoplastic material web 42, into which thermoformed articles 40 have been molded, is conveyed from thermoformer 50 by a suitable feeding or indexing device (not shown) into the gap which is present within the trimming arrangement 19 when movable platen 58 is in the retracted position. The feed device for the thermoplastic web material 42 indexes the latter so as to position a thermoformed article 40 into alignment with the cavity 16 of die shoe 18 and the corresponding cavity present within die plate 20 of stationary die member 15.

Concurrently, the flywheel, when present, or crankarm alone, of trim press 32 is rotated in synchronism with the positioning of the article 40 to thereby advance the crankarm 46 forwardly so as cause the movable platen 58 to slide along the guide rods 48 into engagement with trimming arrangement 19. The throw of the crankarm 46 during the rotation of the flywheel is calibrated so that the protrusions of punch 38 of movable punch member 33 will enter the thermoformed article 40 which is positioned within the gap in axial alignment therewith, and will urge the article 40 onto the die plate 20 of the stationary die member 15, thereby causing the cutting edge of the punch 38 to trim or sever the article 40 from the thermoplastic web 42, with the thermoformed article 40 being retained within cavity 16. During the retractive movement of the movable platen 58 away from the stationary platen 36, the thermoplastic web 42 from which the trimmed article 40 has been severed therefrom drops downwardly toward the grinder 60 and the next thermoformed article to be trimmed is advanced in the direction of arrows A into the gap into axial alignment, as described herein above. The article trimming sequence is then repeated, with the successively severed articles 40 advancing the previously trimmed articles 40 into the cavity 16, thereby causing the severed thermoformed articles 40 to produce a nested stack for handling by the counting and stacking apparatus 10 of the present invention.

Figure 2A:
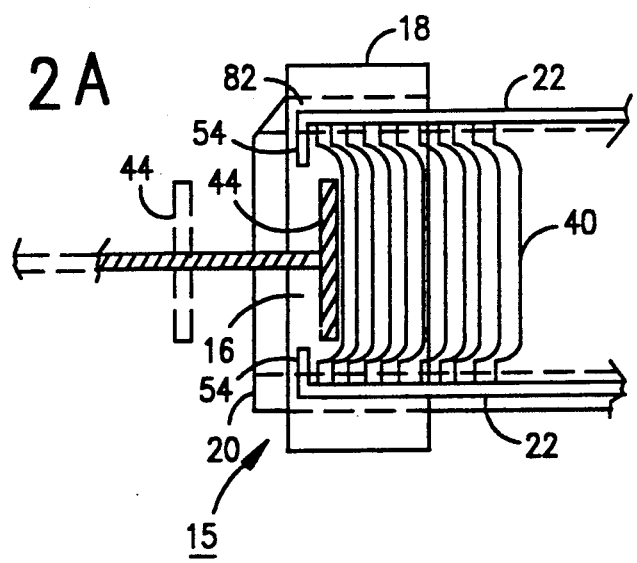
FIGS. 2A—2C schematically represent the operation of an embodiment of the present invention directed to an apparatus for automatically counting and stacking molded articles.
Figure 2B:
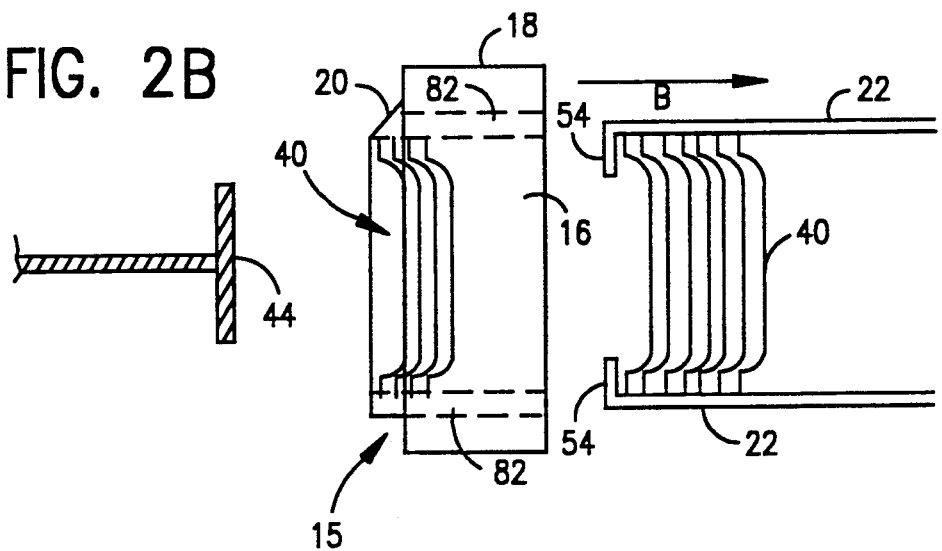
Figure 2C:
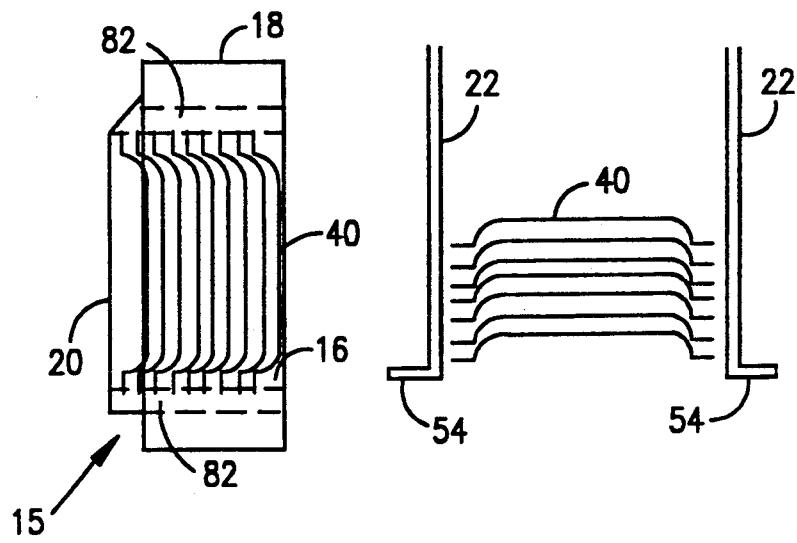

Referring now to FIGS. 2A through 2C, a schematic representation is presented of the operation of the apparatus for automatically counting and stacking molded articles 10 of the present invention. Referring first to FIG. 2A, a stack of thermoformed and trimmed articles 40, of appropriate and desired count, has just been formed. Low mass article ejector 44 is advanced forward from its retracted position within movable punch member 33 (not shown) to push the completed stack of articles 40 past stack dogs 54 of stack rods 22. Advantageously, low mass article ejector 44 is only required to advance the stack of articles a distance of approximately one inch or less, preferably only about ¾ of an inch, compared with ejector mechanisms of conventional design, which often seek to advance the articles a distance of four inches or more, totally exiting the die shoe. This, plus the fact that the ejector 44 is designed to have the lowest mass possible, permits the speed of the trim press 32 (see FIG. 1) to operate at cycle speeds of over 125 cpm, compared to conventional cycle speeds on the order of 80 cpm, and also permits parts to be ejected on the trim stroke. As can be appreciated by those skilled in the art, most ejector mechanisms are not fast enough to feed new material down into the die, trim the part, and eject same before the beginning of the next sequence. After ejection, the stack rods 22 of carriage means 12 (not shown) are rotated so that stack dogs 54 engage the endmost article 40 of the completed stack of articles 40.

With reference now to FIG. 2B, low mass article ejector 44 is retracted into movable punch member 33 (not shown) and carriage means 12 (also not shown) is advanced in the direction of arrow B away from stationary die member 15, thus causing stack dogs 54 of stack rods 22 to pull the completed stack of articles from cavity 16 of die shoe 18. As indicated schematically, while the completed stack of articles 40 is transported away from the stationary die member 15, additional articles 40 continue to be trimmed by trim press 32 and positioned within the cavity of stationary die member 15.

Referring now to FIG. 2C, the stack rods 22 and stack of articles 40 are shown to have been rotated to a vertical position, located away from stationary die member 15. This rotation is optional since, as can be appreciated, some larger stacks of product may be too long to stack vertically. When this is the case, parts can be pulled from the die and left in a horizontal orientation. Stack rods 22 have been rotated about their respective axis so that stack dogs 54 no longer engage the endmost article 40, thus releasing the stack for further handling. As can be appreciated, the stack of articles may be released onto optional conveyor 52, depicted in FIG. 1. As shown in FIG. 2C, articles 40 continue to accumulate within cavity 16 of die shoe 18. Stack rods 22 of carriage means 12 will be repositioned within apertures 82 of die shoe 18 in advance of the time at which another completed stack of articles 40 is formed.

Figure 3A:
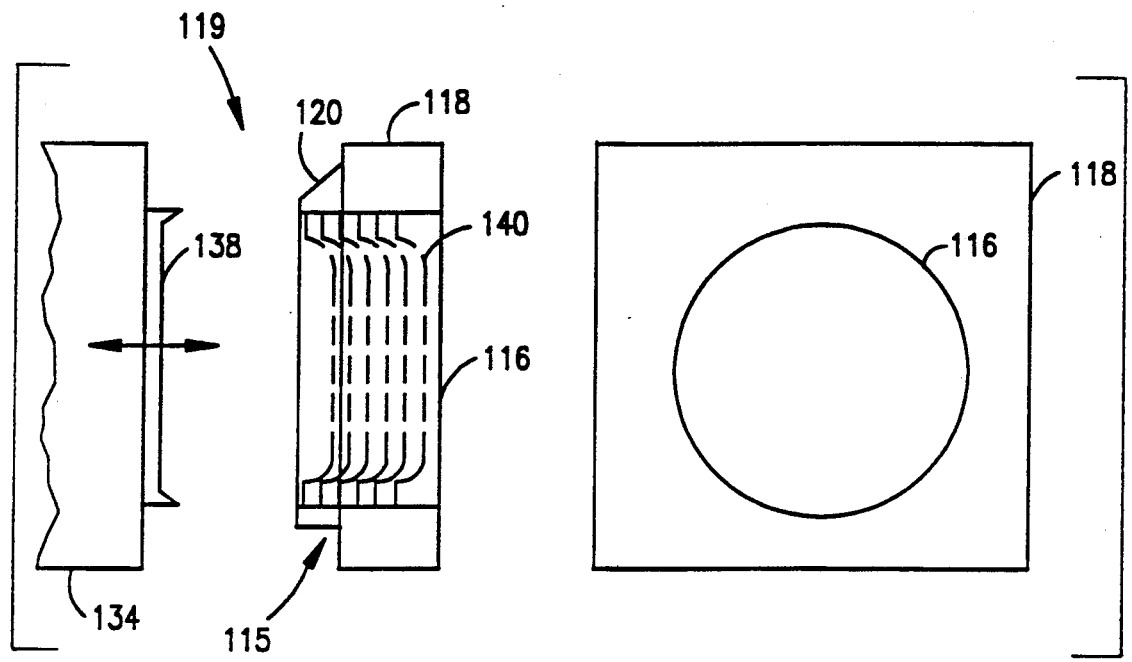
FIG. 3A schematically represents, in a front and a side view, a prior art punch and die arrangement utilized in a trimming operation.
Figure 3B:
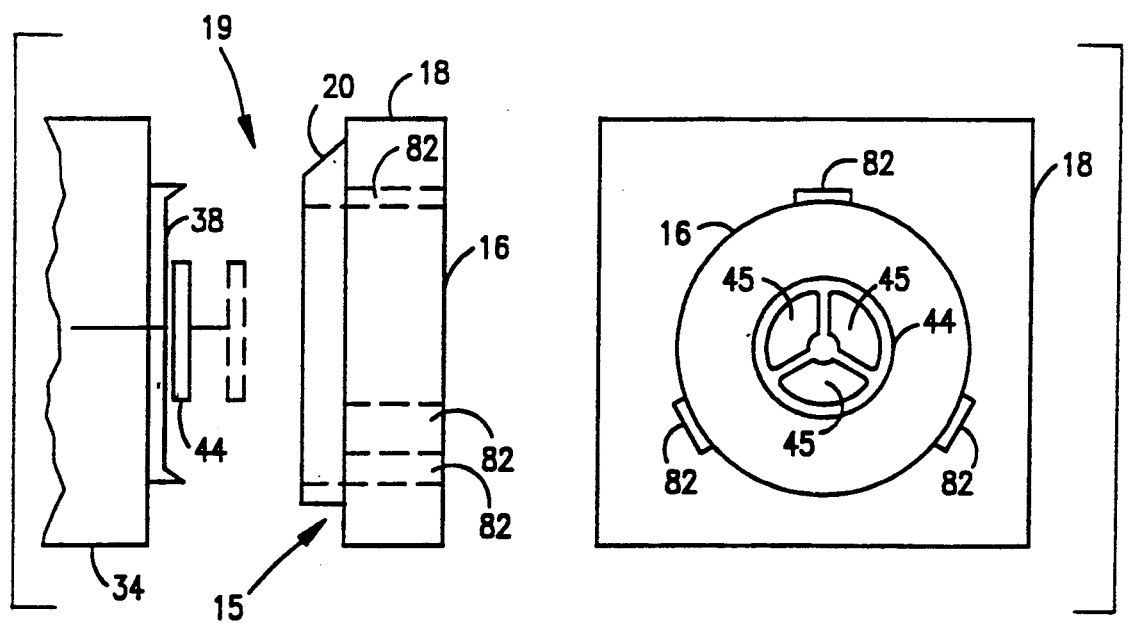
FIG. 3B schematically represents, in a front and a side view, a punch and die arrangement for use in accordance with the present invention.

With reference now to FIG. 3A, a schematic representation of a prior art trimming arrangement 119 for forming a nested stack of trimmed thermoplastic articles 140 is shown in an end and a side view. What is shown in FIG. 3A may be seen to be similar to the arrangement disclosed within U. S. Pat. No. 4,526,074. As can be appreciated by those skilled in the art, articles 140, as they are successively severed from the thermoplastic web (not shown) by punch 138 and stationary die member 115 are positioned within the cavity of die plate 120, advancing the previously severed articles 140 into the cavity of die plate 120 and cavity 116 of die shoe 118. This causes a nested stack of articles 140 to be formed which, when it extends beyond cavity 116 of die shoe 118, will slide onto a platform or a packing table (not shown) from which the stack may then be manually removed. As can be appreciated, no accurate count of the articles 140 residing in the stack is achieved. It is not uncommon in the art to place a visible demarcation at certain intervals in order to provide a means to enable a packer to achieve the desired article count. FIG. 3B schematically represents, also in an end and a side view, an embodiment of a trimming arrangement 19, in accordance with the present invention. As shown, apertures 82 are provided about the periphery of cavity 16 of die shoe 18 for the placement of stack rods 22 (not shown) therein. Low mass article ejector 44 is also shown. As can be appreciated from the end view of FIG. 3B, a plurality of cut-outs 45 contribute to the low mass feature of ejector 44.

Referring now to FIG. 4, a generally schematic representation, in perspective, of the interaction of die shoe 18 and stack rods 22 of a preferred embodiment of the apparatus of the present invention is presented. As shown, apertures 82 traverse the entire width of die shoe 18 and are formed so that one side thereof of each aperture breaks through into cavity 16 of die shoe 18. As can be appreciated, this permits stack dogs 54 to protrude into the cavity 16 so that stack dogs 54 may engage the endmost article 40 (not shown), permitting the stack to be removed from cavity 16 when the desired article count is achieved. Apertures 82, as is preferred, do not protrude into die plate 20.

As can be appreciated by those skilled in the art, article count may be kept by reference to movable platen stroke count, using a sensor appropriate for that purpose. The signal from that sensor may be fed into a controller of a type discussed hereinbelow.

Figure 5:
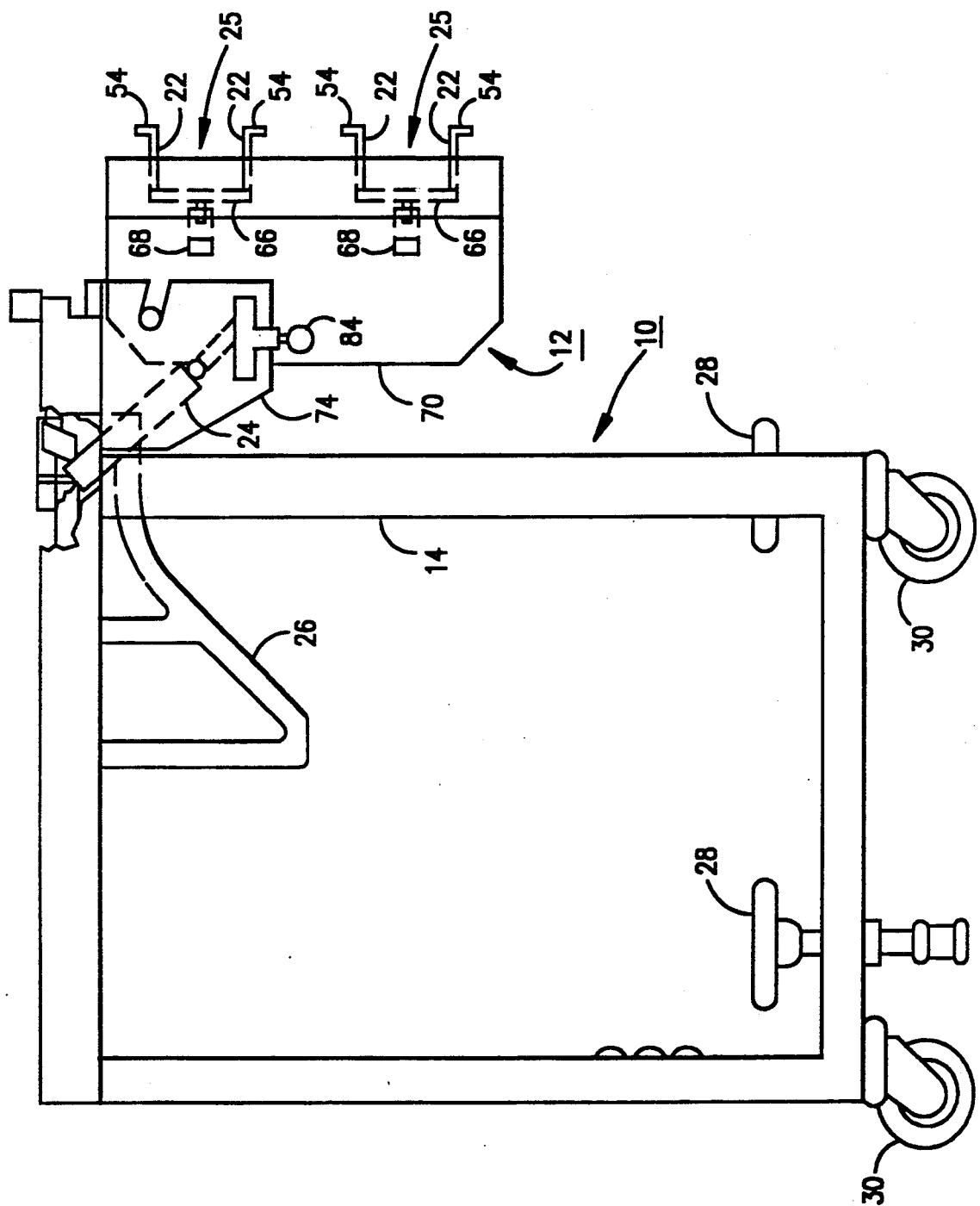
FIG. 5 is side view of one embodiment of an apparatus for automatically counting and stacking formed articles, shown with its carriage means in a position for receiving articles from a trim press, in accordance with the present invention.

Although only a single article trimming apparatus 32 and counting and stacking apparatus 10 have been described thusfar, when a web 42 is presented for trimming which includes a plurality of thermoformed articles 40 molded therein in a side-by-side or tandem relationship, a trim press having a plurality of concurrently acting trimming arrangements 19 can be provided, as those skilled in the art recognize. Likewise, a plurality of concurrently acting stacking mechanisms 25 can be located upon a carriage means 12 of an article counting and stacking apparatus 10. Such an article counting and stacking apparatus 10 is depicted in FIGS. 5 through 9. Referring now to FIG. 5, a side view of a preferred embodiment of an article counting and stacking apparatus is presented, in accordance with the present invention. As may be seen, the apparatus of FIG. 5 is shown with its carriage means 12 in a position for receiving articles from a trim press 32 (not shown).

Figure 6:
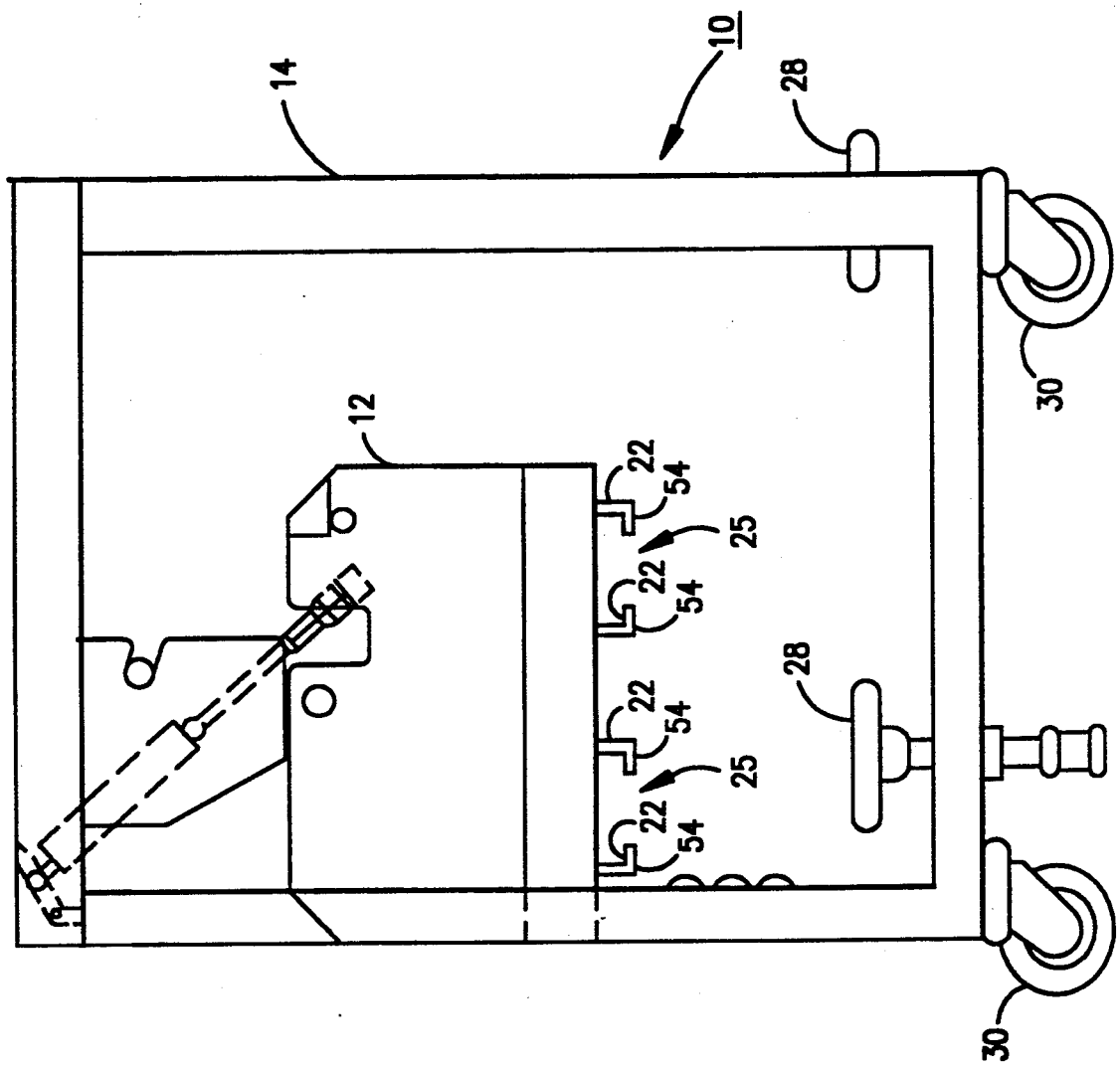
FIG. 6 is side view of the FIG. 5 embodiment of an apparatus for automatically counting and stacking formed articles, shown with its carriage means in a retracted position.

Still referring to FIG. 5, the apparatus 10 may be seen to include frame 14, which is made portable by the provision of casters 30. When brought into position, lock-down mechanisms 28 are utilized to prevent movement during operation. Carriage means 12 is shown having a two-tier stacking mechanism arrangement which is designed to mate with a corresponding two-tier trim press trimming arrangement 19. Such a two-tier arrangement is effectively utilized when smaller parts are being produced. When larger parts are produced, a single tier arrangement will often be required. Carriage means 12 is capable of horizontally traversing frame 14, such a capability enabling completed stacks of articles to be removed from die shoes 18 (not shown). Moreover, as is preferred, carriage means 12 is designed to pivot about pivot point 82 which enables a completed stack of articles 40 to be placed upright on a horizontally disposed conveyor 52, as shown in FIG. 1. The pivoting of carriage means 12 is accomplished by activating pneumatic cylinder 24 which maintains tight contact between a cam and follower arrangement so that carriage means 12 pivots from a substantially horizontal disposition, with respect to the axial orientation of stack rods 22, to a substantially vertical disposition. As can be appreciated, any means capable of causing carriage means 12 to pivot is considered to be within the scope of the present invention. FIG. 6 presents a side view of the FIG. 5 embodiment, shown with carriage means 12 in a fully retracted and vertically pivoted position.

Figure 7:
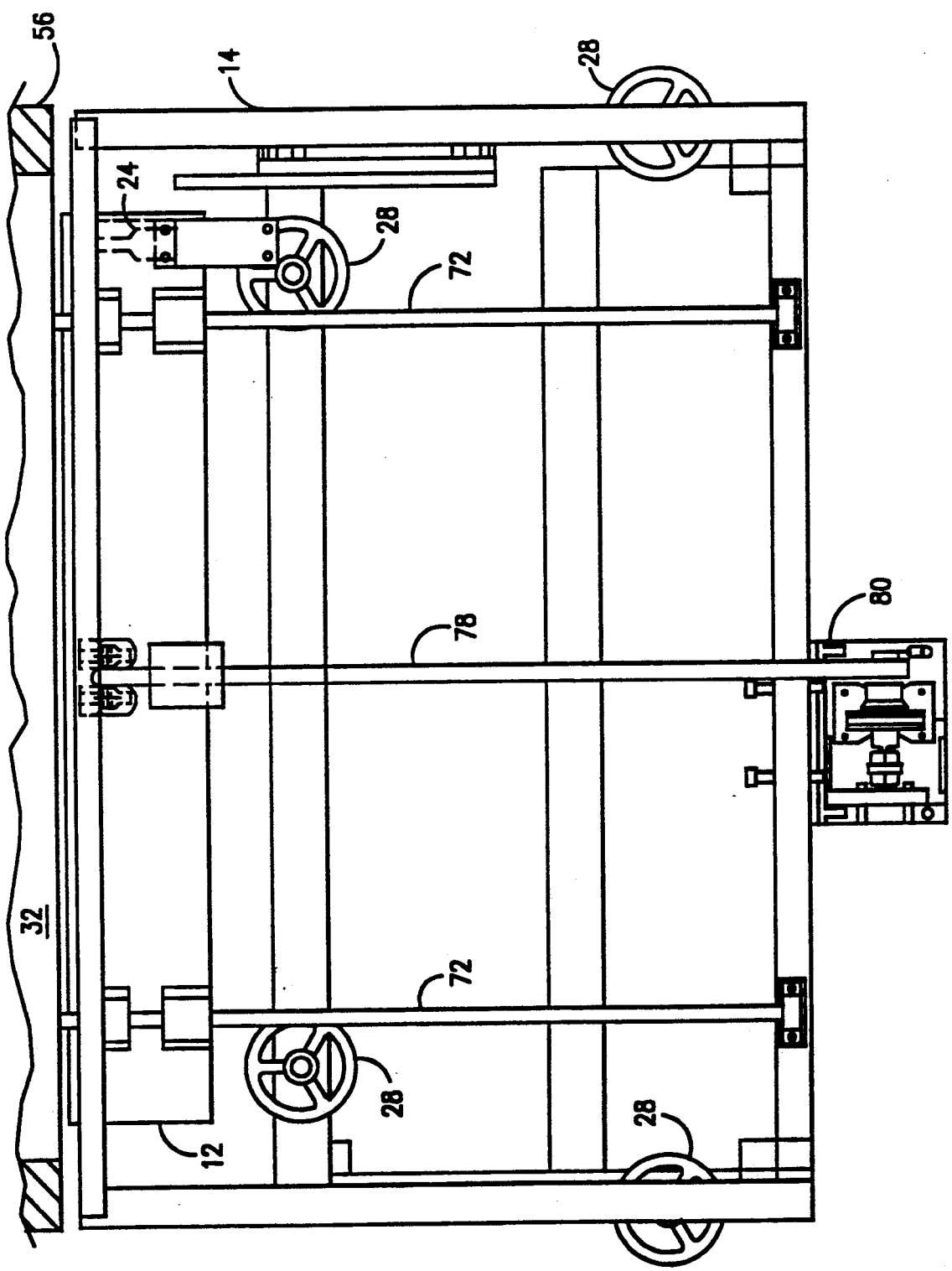
FIG. 7 is top view of the FIG. 5 embodiment, shown with its carriage means in a position for receiving articles from a trim press.

Reference is now made to FIG. 7, in which a top view of the FIG. 5 embodiment of the present invention is shown with carriage means 12 in a position for receiving articles from a trim press 32. FIG. 7 also depicts the means for retracting carriage means 12 away from trim press 32 so that a completed stack of articles 40 may be removed from within a cavity 16 of die shoe 18 of stationary die member 15, to a position for removal from the apparatus. As is preferred, carriage means 12 is retracted away from trim press 32 through the use of a retraction belt 78 and a motor and pulley system 80, although other retraction means can be employed as those skilled in the art will recognize. Guide rods 72 are provided to aid in the smooth retraction of carriage means 12.

Figure 8:
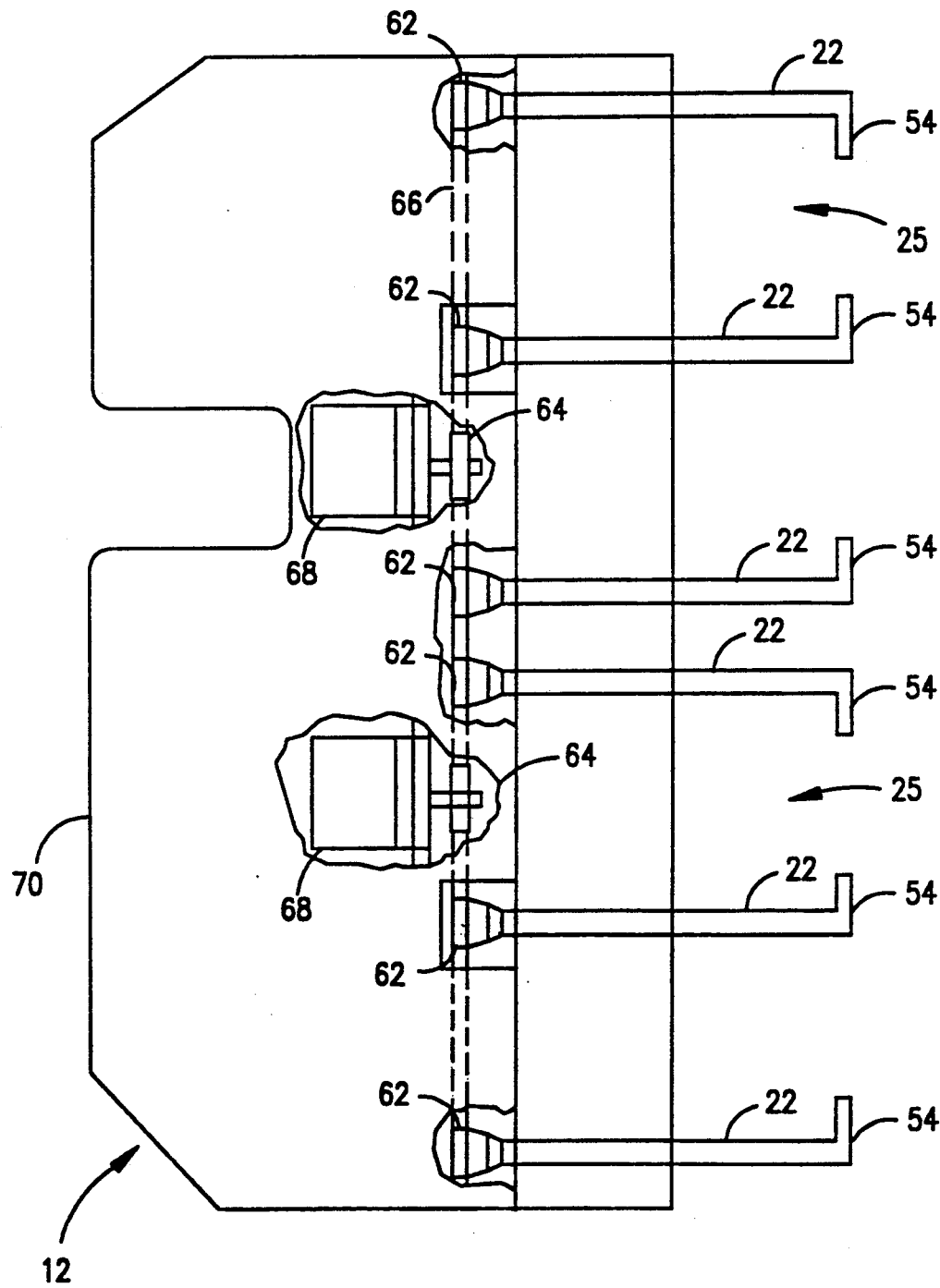
FIG. 8 is a side view of the carriage means of the FIG. 5 embodiment of the apparatus of the present invention.

FIG. 8 presents an enlarged side view of the carriage means 12 of the FIG. 5 embodiment. As indicated above, carriage means 12 also includes means for rotating stack rods 22 so that stack dogs 54 can engage an endmost article 40 of a completed stack of articles. As is preferred, the means for rotating stack rods 22 is a belt driven motor and pulley arrangement in which each tier of stacking mechanisms has a dedicated 90° rotating air cylinder 68. Each air cylinder 68 has a pulley 64 for engagement with belt 66. As can be appreciated, although a rotating air cylinder is preferred for use in the practice of the present invention, other means, including an electric motor, could be used in conjunction with proper controls. Each stack rod has a pulley 62, also for engagement with belt 66. Pulley 62 is mounted at an end of stack rod 22 which is opposite the stack dog 54. Carriage means 12 also includes side plates 70 (one on each side of carriage means 12) which serve to hold the mechanism together.

Figure 9:
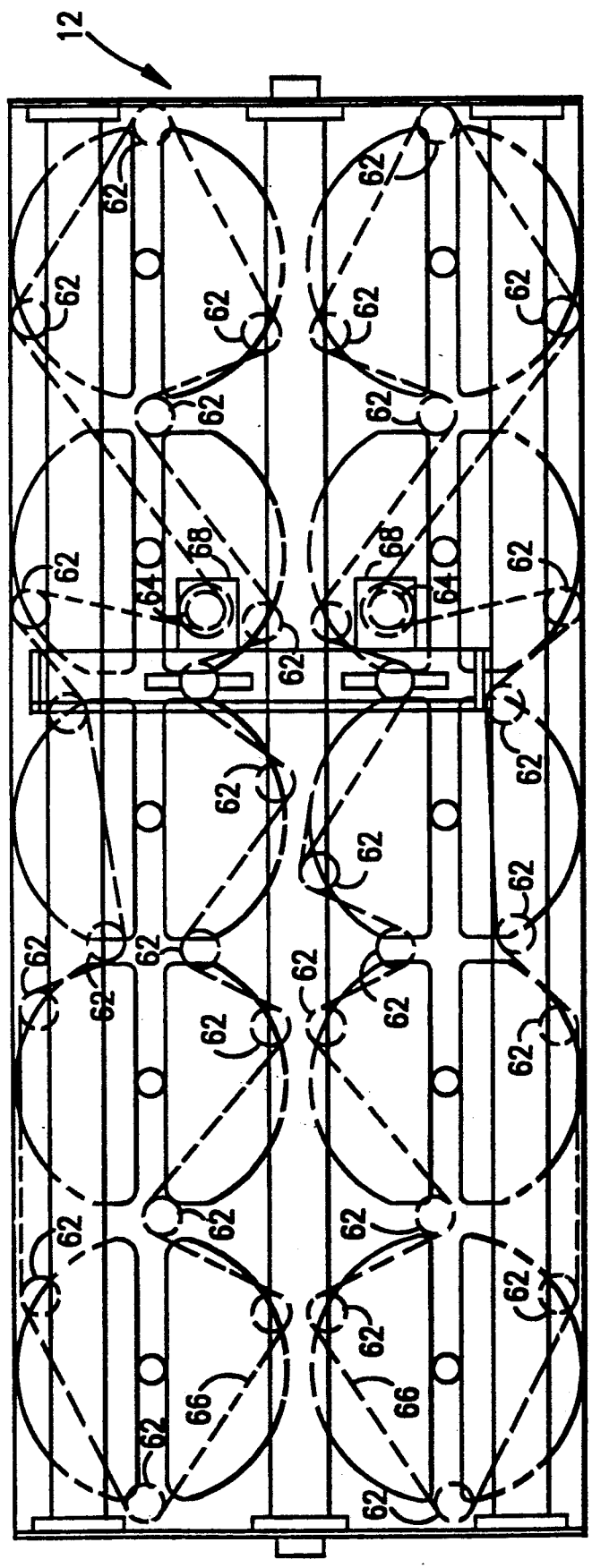
FIG. 9 is a back view of the carriage means of the FIG. 5 embodiment of the apparatus of the present invention, showing the means for rotating the stack bars of the article stacking mechanism.

FIG. 9 presents a back view of carriage means 12 of the FIG. 5 embodiment, showing in detail the preferred means for rotating a plurality of stack bars 22 of the article stacking mechanisms 25. Note that a single drive belt 66 is capable of rotating all pulleys 62 of stack rods 22 present in a tier of stacking mechanisms 25. As shown, a total of 10 sets of stacking mechanisms are present in the two-tier arrangement depicted. As those skilled in the art will plainly recognize the counting and stacking apparatus of the present invention is capable of being configured in a wide variety of arrangements, with the present invention not to be limited to the configurations depicted in FIGS. 1 through 9.

As can be appreciated by those skilled in the art, article counting, stacking and stack ejection operations, as well as other apparatus control functions can be controlled through the use of a microprocessor, as is preferred. Such control technology, being well known, requires no further explanation for a complete understanding of the present invention. Any of a number of commercially available controllers are considered to be suitable in the practice of the present invention. The controller utilized in apparatus 10 may be located within a cabinet mounted on frame 14 or remote from same. Additionally, to rapidly shut down apparatus 10 in the event of an article jam or safety related problem, stop buttons may be located at a plurality of locations about the unit.

To prevent inadvertent operator contact during operation, additional safety guards (not shown) may be provided as needed. Guards may be optionally provided in locations where operator contact is likely.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. An apparatus for forming a stack of molded articles successively trimmed by a trim press from a web of thermoplastic material, the trim press having a stationary die member which includes a die plate and a die shoe, the apparatus comprising:
   (a) a frame;
   (b) a carriage means mounted to said frame;
   (c) at least one stacking mechanism, said stacking mechanism comprising:
      (i) a plurality of stack rods rotatively mounted to said carriage means, each of said stack rods having a stack dog integrally connected and substantially perpendicular to a first end thereof, said stack dog positionable within a corresponding aperture of the die shoe of the stationary die member; and
      (ii) means for rotating said stack rods so that said stack dogs engage an endmost article of the formed stack of articles, the stack of articles located at least partially within the die shoe of the stationary die member; and
   (d) means for transporting the completed stack of articles from within the die shoe of the stationary die member to a position for removal from the apparatus, said means for transporting the completed stack of articles from within the die shoe of the stationary die member to a position for removal from the apparatus comprising means for rotating the stack of articles from a substantially horizontal position to a substantially vertical position.

2. The apparatus of claim 1, wherein said means for rotating said stack rods comprises a motor-driven belt and pulley system.

3. The apparatus of claim 1, wherein said carriage means is mounted to said frame so as to permit horizontal movement of said carriage means along said frame.

4. The apparatus of claim 3, wherein said means for transporting the completed stack of articles from within the die shoe of the stationary die member to a position for removal from the apparatus comprises a motor-driven belt and pulley system in cooperation with said horizontally movable carriage means.

5. The apparatus of claim 1, further comprising means for ejecting a completed stack of articles into a position for engagement of an endmost article of the completed stack of articles with said stack dogs of said stack bars.

6. The apparatus of claim 5, further comprising a microprocessor controller for controlling the operation thereof.

7. The apparatus of claim 1, further comprising a conveying means for transferring the completed stack of thermoplastic articles to another location for further activity.

8. The apparatus of claim 1, further comprising a microprocessor controller for controlling the operation thereof.

* * * * *